United States Patent [19]

Harris

[11] Patent Number: 4,805,809
[45] Date of Patent: Feb. 21, 1989

[54] DISPENSING PACKAGE FOR A VISCOUS PRODUCT

[75] Inventor: Kurt N. Harris, Haskins, Ohio

[73] Assignee: Owens-Illinois Closure Inc., Toledo, Ohio

[21] Appl. No.: 167,939

[22] Filed: Mar. 14, 1988

[51] Int. Cl.$^4$ ............................................. G01F 11/04
[52] U.S. Cl. .................................. 222/260; 222/383; 222/385
[58] Field of Search .............................. 222/256–257, 222/259–260, 383, 385, 386, 391, 387, 340, 341

[56] References Cited

FOREIGN PATENT DOCUMENTS 3530486  3/1987  Fed. Rep. of Germany ...... 222/387
3545743  6/1987  Fed. Rep. of Germany ...... 222/391

Primary Examiner—Charles A. Marmor

[57] ABSTRACT

A package for containing and dispensing a viscous product such as toothpaste. The package includes a cylindrical container with a wall extending across an end of the container, such end serving as a dispensing end, and the wall has an opening which is surrounded by a spout through which the viscous product is dispensed. A pumping piston is positioned within the container near the dispensing end to subdivide the container into a reservoir below the pumping piston and a staging area above the pumping piston and in communication with the discharge spout, and to pump viscous product through the discharge spout by the movement of the pumping piston toward the discharge spout. The pumping piston is advanced toward the discharge spout by an oscillatable dispensing pump in the form of a first class lever which has a button at one end and a pumping piston engaging element extending from the other end, with biasing means being provided to bias the dispensing pump and the pumping piston back to initial, non-pumping positions. The inside surface of the container wall has recesses for the flow of viscous product from the reservoir toward the staging area when the pumping piston is not in its pumping stroke as well as an aperture in the pumping piston for the same purpose, such aperture being sealed by the pumping piston engaging element during a pumping stroke.

21 Claims, 2 Drawing Sheets

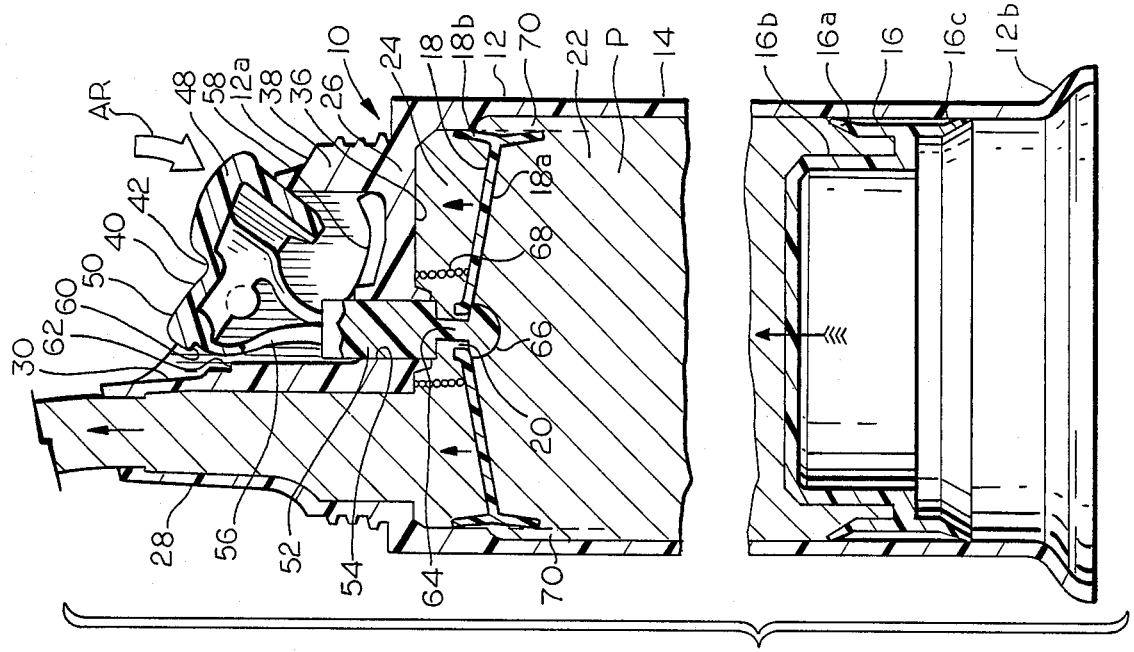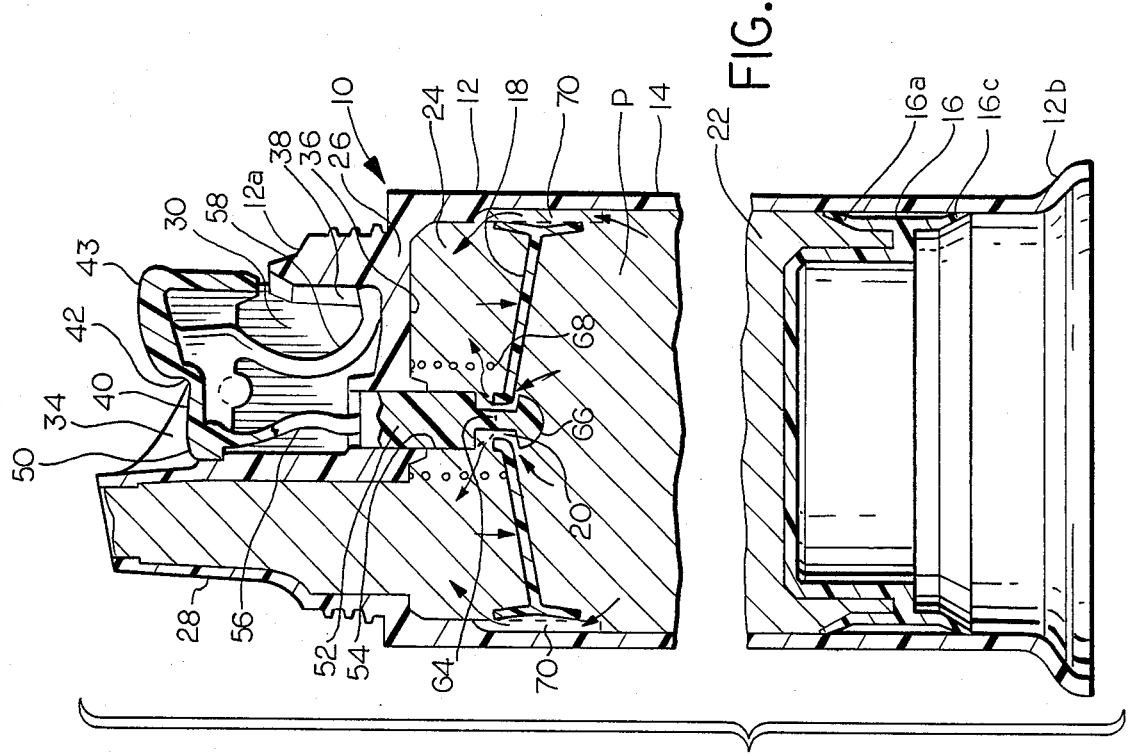

DISPENSING PACKAGE FOR A VISCOUS PRODUCT

BACKGROUND OF THE INVENTION

1. Field of the Invention

This invention relates to a hand-operable dispensing package for a viscous product such as a gel, a cream or a paste such as toothpaste. More particularly, this invention relates to a hand-operable dispensing package for a viscous product in which the product to be dispensed is contained within a cylindrical chamber and is dispensed from one end of the chamber under the influence of a pumping member at the one end in combination with a piston, usually referred to as a "follower piston", that moves within the chamber from the other end to the one end by virtue of partial vacuum conditions which are created within the chamber by the dispensing of the product.

2. Description of the Prior Art

U.S. Pat. No. 4,533,069 (J. L. Drobish) discloses a prior art hand-operable dispensing package for a fluid product in which the product is contained in a cylindrical portion of the package and is dispensed from a dispensing outlet at one end of the cylindrical portion under the influence of a hand-operable pumping element at the one end, in combination with an ambient air pressure operated follower piston that moves within the cylindrical portion from the other end to the one end. U.S. Pat. Nos. 4,474,313 (W. Sieverding); 4,564,130 (J. Eulenburg); 4,511,068. (J. Bossina) and 4,538,747 (A. von Schuckmann) disclose other dispensing packages of this general type. Packages of this general type have been used in the packaging of toothpaste and other high viscosity products. However, prior art dispensing packages for viscous products such as toothpaste are rather expensive, as the performance criteria for such packages, in terms of the reliability of dispensing the product and the reliability of sealing the package in a non-dispensing state, have heretofore been achieved by designs which are rather complex, in terms of the number of components of each such package or in terms of the complexity of one or more of such components. Further, such prior art dispensing packages have involved problems of refilling the portion of the container at the dispensing end with viscous product due to the resistance to flow of the viscous product within the container, which can lead to "suck back" of product into the container from the dispensing spout unless a check valve or similar obstruction to flow is provided.

SUMMARY OF THE INVENTION

According to the present invention there is provided a dispensing package for a viscous product which includes a cylindrical, product-containing body portion, a hand-operable spring biased dispensing pump and dispensing spout at one end of the cylindrical portion, and a partial vacuum-actuated follower piston that gradually moves within the cylindrical portion toward the one end thereof as product is gradually dispensed from the package. The package includes a pumping piston which is positioned within the cylindrical portion of the dispensing package and which extends transversely thereof. The pumping piston is positioned beneath, but near, the dispensing spout and subdivides the cylindrical portion into a first portion and a second portion. The first portion serves as a staging area, and is in direct communication with the dispensing spout, and the second portion serves as a product containing reservoir.

The pumping piston has an aperture therein and this aperture receives an enlarged head portion of a connector element of the dispensing pump. The pumping piston is drawn toward the dispensing spout by a dispensing load applied to a contact element of the dispensing pump, against the force of a resilent biasing portion of the dispensing pump which normally biases the contact element of the dispensing pump to a non-pumping position, an action which moves the connector element of the dispensing pump toward the dispensing spout. During the pumping cycle, as described, the enlarged head portion of the connector element of the dispensing pump sealingly engages the aperture in the pumping piston against the flow of the viscous product therethrough. However, the connector is designed so that the enlarged head portion will not seal against the aperture in the pumping piston during the return cycle of the pumping piston, after the dispensing load has been removed from the contact element and the resilient biasing portion of the dispensing pump is returning the contact element thereof to its non-pumping position, to permit the flow of viscous product from the product container reservoir to the staging area, and to thereby at least partly replace the viscous product which has been pumped from the staging area during the pumping cycle. Further, the cylindrical body portion of the dispensing package in which the pumping piston reciprocates, under the alternating loads imposed by the connector element of the dispensing pump and the resilient biasing portion thereof, has recesses in its inside surface in the region occupied by the pumping piston in its relaxed, non-pumping state. These recesses act as passages or louvers to further enhance the flow of viscous product from the product containing reservoir to the staging area during the non-pumping cycle of the dispensing pump by providing extra paths for the flow of viscous product between the outside of the pumping piston and the inside of the cylindrical body portion. However, these recesses terminate at the location reached by the pumping piston when it begins its pumping stroke, to prevent viscous product backflow into the product containing reservoir during the pumping stroke.

Accordingly, it is an object of the present invention to provide an improved dispensing package for a viscous product. More particularly, it is an object of the present invention to provide a simple, reliable and relatively inexpensive hand-operable dispensing package for a viscous product. Even more particularly, it is an object of the present invention to provide a hand-operable dispensing package with improved internal viscous product flow characteristics to ensure a full change of viscous product within the container near the dispensing end thereof.

For a further understanding of the present invention and the objects thereof, attention is directed to the drawing and the following brief description thereof, to the detailed description of the preferred embodiment and to the appended claims.

BRIEF DESCRIPTION OF THE DRAWING

FIG. 4 is a vertical sectional view of the dispensing package of FIG. 1, with a portion of such dispensing package being broken away;

FIG. 5 is a view similar to FIG. 4 showing the dispensing package thereof during its pumping cycle.

DETAILED DESCRIPTION OF THE PREFERRED EMBODIMENT

Figure 2:
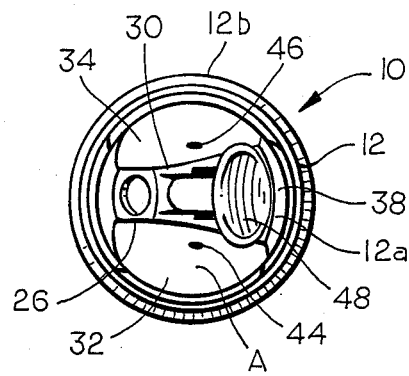
FIG. 2 is a top plan view of the dispensing package of FIG. 1.
Figure 6:
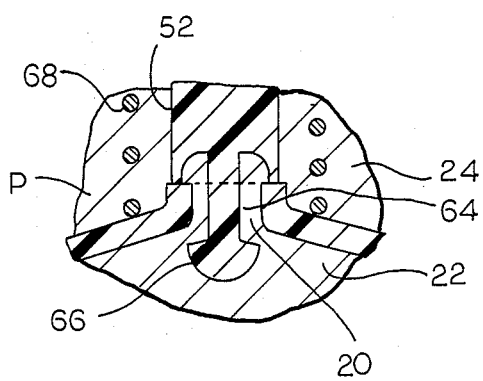
FIG. 6 is a fragmentary sectional view of a portion of the dispensing package of the present invention in the FIG. 4 condition of such package, and taken on a plane extending transversely of the plane on which the FIG. 4 sectional view is taken.
Figure 3:
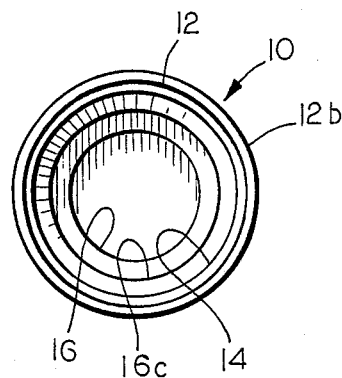
FIG. 3 is a bottom plan view of the dispensing package of FIG. 1.
Figure 1:
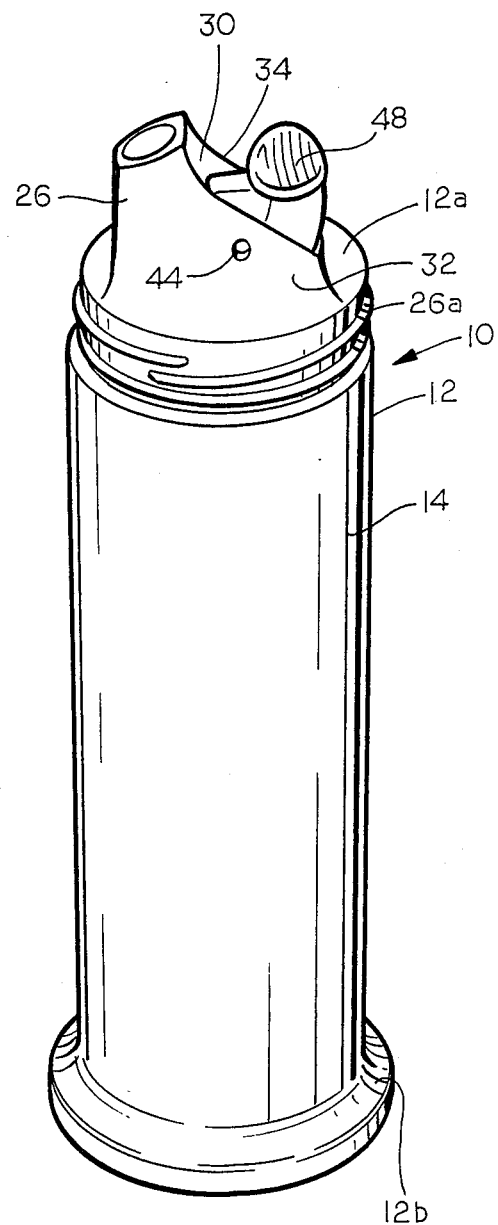
FIG. 1 is a perspective view of a preferred embodiment of a dispensing package according to the present invention.

As is shown in the various drawing figures, according to the present invention there is provided a dispensing package which is generally identified by reference numeral 10. The dispensing package 10 is suitable for the packaging and dispensing of a viscous product P, for example, toothpaste, and is made up of a generally cylindrical container 12 which has a dispensing end 12a that is at the top of the dispensing package 10 in the illustrated upright orientation of the dispensing package 10. Further, the generally cylindrical container 12 also has a bottom end 12b.

The generally cylindrical container 12 is made up of a generally cylindrical body portion 14 which, preferably, is circular in cross-section, and a one-way movable piston 16 which is positioned within the body portion 14 near the bottom end 12b of the container 12. A reciprocating pumping piston 18 with an aperture 20 therein is positioned within the body portion 14 of the container 12 near the dispensing end 12a of the container 12 and separates the interior of the container 12 into a reservoir 22, which is positioned between the pumping piston 18 and the movable piston 16, and a staging area 24, which is positioned between the pumping piston 18 and the dispensing end 12a of the container 12. The dispensing end 12a of the container 12 is provided with a transversely extending end structure 26 having a dispensing spout 28 which is in fluid communication with the staging area 24, and through the pumping action of the pumping piston 18, as hereinafter described, the product P is caused to flow from the staging area through the dispensing spout 28. The end structure 26 is provided with an external helical thread 26a to permit an internally threaded, cup-shaped closure (not shown) to be affixed to the end structure 26 during periods of time when the package 10 is in shipment or storage.

The pumping piston 18 is made up a generally planar central portion 18a and an outer annular portion 18b which has an appreciable length in a direction extending parallel to the longitudinal central axis of the generally cylindrical container 12. The outside of the annular portion 18b of the pumping piston 18 slidingly engages the inside of the cylindrical body portion 14, at least in the region traversed by the pumping piston as it reciprocates within the body portion 14, as hereinafter explained, and the appreciable length of the annular portion 18b serves to prevent the pumping piston 18 from wobbling as it reciprocates within the cylindrical body portion 14. A pumping piston 18, in the illustrated complex configuration, may be mass produced to acceptable specifications and at competitive prices in a single integral piece from a relatively hard, thermoplastic material, such as high density polyethylene or polypropylene, by injection molding.

The end structure 26 of the dispensing end 12a of the dispensing container 12 further has an outwardly facing recess 30 which is defined by spaced apart sidewalls 32 and 34, a bottom wall 36, the dispensing spout 26, and an end wall 38 which is spaced from the dispensing spout 26. The recess 30 receives a major portion 40 of a complex dispensing pump 42, the dispensing pump 42 being pivotally attached to the sidewalls 32 and 34, for example, by axially aligned projections (not shown) which are received in apertures 44 and 46 and the sidewalls 32 and 34, respectively, for oscillation of the dispensing pump 42 with respect to the end structure 26 about an axis identified by the letter "A" in FIG. 2. The generally cylindrical container 12 of the dispensing package 10, in the illustrated complex configuration, may be mass produced to acceptable specifications and at competitive prices from a suitable thermoplastic material, such as high density polyethylene or polypropylene, by injection molding.

The major portion 40 of the dispensing pump 42 is arranged as a first class lever with respect to the axis "A", with a downwardly depressible, finger engaging contact button 48 on one side of the axis A and a lifter portion 50 on the other side of the axis A. The dispensing pump 42 further has a rod portion 52 which is slidingly reciprocable along a vertically extending axis in an aperture 54 in the bottom wall 36 of the end structure 26 of the body portion 14, and which is connected to the lifter portion 50 by a flexible connector portion 56 of the dispensing pump 42. Thus, by depressing the button 48 of the dispensing pump 42 in the direction of the arrow AR in FIG. 5, the rod portion 52 of the dispensing pump 42 will be lifted along its vertically extending axis within the aperture 54 in the end structure 26. The dispensing pump 42 further has a resilient tail portion 58 which is positioned on the same side of the axis A as the button 48 and which is trapped within the outwardly facing recess 30 of the end structure 26. The tail portion 58 of the dispensing pump 42 serves as a spring to bias the dispensing pump 42 toward the position indicated in FIG. 4, so as to return the dispensing pump 42 from the FIG. 5 position, which is the pumping position, to the FIG. 4 position upon the removal of a dispensing load in the direction of the arrow AR from the button 48. Motion of the dispensing pump 42 past the FIG. 4 position is blocked by a downwardly facing shoulder 60 on the underside of the lifter portion 50 which engages an upwardly facing shoulder 62 on the dispensing 28 spout at the FIG. 4 position.

The rod portion 52 of the dispensing pump 42 has a second connector portion 64 depending therefrom, and the second connector portion 64 has an enlarged head portion 66 depending therefrom. The second connector portion 64 passes through the aperture 20 in the pumping piston 18 and is substantially smaller than the aperture 20, thus forming a path between the outside of the second connector portion 64 and the inside aperture 20 which permits the product P to flow from the reservoir 22 into the staging area 24 when the dispensing pump 42 is in its non-dispensing, relaxed condition, as is shown in FIG. 4. However, during the pumping cycle, as is shown in FIG. 5, the enclosed head portion 66 of the dispensing pump 42, which is larger than the aperture 20 in the pumping piston 18, engages and seals the aperture 20 to prevent the backflow of product P therethrough, to thereby help to ensure that the pumping stroke of the pumping piston 18, from the FIG. 4 position to the FIG. 5 position, effectively dispenses product P from the outlet of the dispensing spout 28. Preferably, the underside of the rod portion 52 is in the configuration of a downwardly facing part of a cylinder, to properly radially outwardly direct the product P which is flowing through the aperture 20 from the reservoir 22 to the staging area 24 during the pumping cycle. At the conclusion of the pumping cycle, the pumping piston 18 is returned from its FIG. 5 position to its FIG. 4 position by the action of a coil spring 68 which is compressibly trapped between the, underside of the bottom wall 36 of the end structure 26 and the top of the pumping piston 18. The dispensing pump 42, from the contact button 48 to the enlarged head portion 66 and including the tail portion 58, may be mass produced to acceptable specifications and at competitive prices in a single, integral piece from a suitable thermoplastic material, such as high density polyethylene or polypropylene, by injection molding The portion of the inside surface of the body portion 14 of the generally cylindrical container 12 which is traversed by the outer portion 18b of the pumping piston 18 as the pumping piston reciprocates between its FIG. 4 non-pumping position and its FIG. 5, pumping position has a smaller diameter than the portion of the wall of the body portion 14 which is there below, and is provided with a circumferential series of spaced apart recesses 70 therein in the portion thereof which is adjacent to the outer annular portion 18b of the pumping piston 18 when it is in its FIG. 4, non-pumping position. Thus, the recesses 70 act as louvers to enhance the flow of product P from the reservoir 22 to the staging area 24 after the conclusion of the pumping cycle, and in that sense serve to augment the flow of product P through the aperture 20 in the pumping piston 18 which is occurring at the same time, as heretofore explained. The enhancement of the flow of product P from the reservoir 22 to the staging area 24 helps to prevent "suck back" of product P from the dispensing spout 28 into the staging area 24, a problem which is dealt with in various prior art devices by the use of a check valve or comparable retardants to flow. In any case, the vertical extent of the recesses 70 stops shortly after the elevation reached by the pumping piston 18 as it moves from its FIG. 4, non-pumping position to its FIG. 5, pumping position, so that, during such pumping cycle, a seal is formed between the top of the outer annular portion 18b of the pumping piston 18 and the inside surface of the cylindrical body portion 14 to ensure that the pumping action of the pumping piston 18 will dispense product P through the outlet of the discharge spout 28.

As product P flows from the reservoir 22 to the staging area 24 during the pumping cycle of the dispensing package 10, as heretofore explained, a partial vacuum is created in the reservoir 22; and this partial vacuum is relieved by the movement of the movable piston 16 upwardly within the body portion 14 of the container 12 in response to the pressure differential experienced by the follower piston 16, whose underside is exposed to atmospheric pressure, when its upper side experiences a sub-atmospheric pressure. This process can be repeated many times until such time as the follower piston 16 makes physical contact with the reduced diameter portion of the wall of the body portion 14, at the elevation of the recesses 70, at which time substantially all product in the reservoir 22 has been emptied. As is shown, the movable piston 16 is provided with an upper sealing fin 16a that extends upwardly and outwardly from a main body portion 16b of the movable piston 16 to sealingly and slidely engage the inside surface of the body portion 14 of the container 12. Ideally, the movable piston 16 will have sufficient axial length, along the longitudinal central axis of the dispensing package 10, so that its extent, along such longitudinal central axis, will be sufficient to prevent it from wobbling as it moves upwardly within the body portion 14. The movable piston 16 is also provided with a lower sealing fin 16c which extends outwardly and downwardly from the main body portion 16b and which sealingly and slidingly engages the inside surface of the body portion 14 at an elevation below the level of the engagement between the upper sealing fin 16a and the inside of the body portion 14. The movable piston 16, in the illustrated complex configuration, may also be massed produced according to acceptable specifications and at competitive prices from a relatively hard, thermoplastic material, such as high density polyethylene or polypropylene, by injection molding.

Although the best mode contemplated by the inventor for carrying out the present invention as of the filing date hereof has been shown and described herein, it will be apparent to those skilled in the art that suitable modifications, variations, and equivalents may be made without from departing from the scope of the invention, such scope being limited solely by the terms of the following claims.

What is claimed is:

1. A dispensing package for containing and dispensing a viscous product, said dispensing package comprising:

a container having a generally cylindrical body portion with an inside, a first end and a second end, one of said first end and said second end serving as a dispensing end, said container further having wall means extending across said dispensing end of said container, said wall means forming a dispensing spout, said inside of said generally cylindrical body portion having a first portion and a second portion, said first portion being closer to said dispensing end of said container than said second portion, said first portion having a first inside diameter, said second portion having a second inside diameter, said first inside diameter being smaller than said second inside diameter;

a pumping piston having a central portion with an aperture therein and an outer annular portion, said outer annular portion slidingly engaging said first portion of said inside of said generally cylindrical body portion, said pumping piston being reciprocable along an axis of reciprocation within said generally cylindrical body portion between a first position and a second position, said first position being closer to said dispensing end of said container than said second position, said pumping piston separating said dispensing package into a reservoir and a staging area, said staging area being closer to said dispensing end than said reservoir;

recess means in said first portion of said generally cylindrical body portion, said recess means being open to flow of the viscous product from said reservoir to said staging area when said pumping piston is in said second position, said recess means being closed to flow of the viscous product from said reservoir to said staging area by said outer annular portion of said pumping piston when said pumping piston is in said first position;

externally operable dispensing pump means for pumping the viscous product from said container through said dispensing spout, said pump means having a pumping piston engaging portion which extends through said aperture in said central portion of said piston, said pumping piston engaging portion being reciprocable by the operation of said dispensing pump means and engaging said pumping piston to move said pumping piston toward said dispensing end by the operation of said dispensing pump means, said portion having an enlarged head portion, said enlarged head portion sealingly engaging said aperture in said central portion as said pumping piston is moving toward said dispensing end; and a follower piston positioned within said cylindrical body portion of said container away from said dispensing end of said container, said follower piston having a first side in contact with the viscous product and a second side, said second side being open to atmospheric pressure, said follower piston sealingly and slidingly engaging said inside of said body portion of said container.

2. A dispensing package according to claim 1 wherein said recess means in said first portion of said generally cylindrical body portion comprises a circumferential series of spaced apart recesses.

3. A dispensing package according to claim 1 wherein said externally operable dispensing pump means further has a major portion with a hand engageable portion and a lifter portion, said major portion being attached to said container at said dispensing end for pivoting with respect to said container about an axis, said axis being between said hand engageable portion and said lifter portion, said pumping piston engaging portion being connected to said lifter portion.

4. A dispensing package according to claim 3 whereas said major portion of said externally operable dispensing pump means is pivotable with respect to said container between a first position corresponding to said first position of said pumping piston and a second position corresponding to said second position of said pumping piston, and wherein said externally operable dispensing pump means further has resilient means extending between said hand engageable portion and said dispensing end of said container, said resilient means biasing said major portion toward said second position.

5. A dispensing package according to claim 4 wherein said externally operable dispensing pump means, including said pumping piston engaging portion, said major portion and said resilient means comprises a single piece which is formed integrally from a thermoplastic material.

6. A dispensing package according to claim 3 wherein said pumping piston engaging portion further has a connector portion extending from said enlarged head portion toward said lifter portion, said connector portion being smaller in a direction extending transversely of said axis of reciprocation of said pumping piston than said enlarged head portion and defining an annular opening with said aperture in said central portion of said pumping piston, said annular opening being open to flow of the viscous product from said reservoir to said staging area when said pumping piston is in said second position.

7. A dispensing package according to claim 6 wherein said pumping piston engaging portion further has a rod portion extending from said connector portion toward said lifter portion, said rod portion being large in relationship to said connector position in a direction extending transversely of said axis of reciprocation of said pumping piston, wherein said wall means of said container has an aperture extending therethrough, said rod portion being slidingly reciprocable in said aperture of said wall means of said container along an axis extending parallel to said axis of reciprocation of said pumping piston.

8. A dispensing package according to claim 7 wherein said pumping piston engaging portion further comprises a flexible connector portion extending between said rod portion and said lifter portion.

9. A dispensing package according to claim 8 wherein said connector portion is connected to said rod portion at a downwardly facing surface of said rod portion, and wherein said downwardly facing surface has a part cylindrical configuration.

10. A dispensing package according to claim 1 and further comprising spring means compressed between said dispensing end of said container and said central portion of said pumping piston and resiliently biasing said pumping piston toward said second position.

11. In combination with a mass of viscous product, a package containing said mass of viscous product for dispensing of viscous product from said mass, said package comprising:

a container having a generally cylindrical body portion with an inside, a first end and a second end, one of said first end and said second end serving as a dispensing end, said container further having wall means extending across said dispensing end of said container, said wall means forming a dispensing spout, said inside of said generally cylindrical body portion having a first portion and a second portion, said first portion being closer to said dispensing end of said container than said second portion, said first portion having a first inside diameter, said second portion having a second inside diameter, said first inside diameter being smaller than said second inside diameter, a pumping piston having a central portion with an aperture therein and an outer annular portion, said outer annular portion slidingly engaging said first portion of said inside of said generally cylindrical body portion, said pumping piston being reciprocable along an axis of reciprocation within said generally cylindrical body portion between a first position and a second position, said first position being closer to said dispensing end of said container than said second position, said pumping piston separating said dispensing package into a reservoir and a staging area, said staging area containing a first portion of said mass and being closer to said dispensing end than said reservoir, said reservoir containing a second portion of said mass;

recess means in said first portion of said generally cylindrical body portion, said recess mean being open to flow of the viscous product from said reservoir to said staging area when said pumping piston is in second position, said recess means being closed to flow of said viscous product from said second portion to said first portion by said outer annular portion of said pumping piston when said pumping piston is in said first position;

externally operable dispensing pump means for pumping viscous product from said first portion of said mass from said container through said dispensing spout, said pump means having a pumping piston engaging portion which extends through said aperture in said central portion of said piston, said pumping piston engaging portion being reciprocable by the operation of said dispensing pump means and engaging said pumping piston to move said pumping piston toward said dispensing end by the operation of said dispensing pump means, said portion having an enlarged head portion, said enlarged head portion sealingly engaging said aperture in said central portion as said pumping piston is moving toward said dispensing end; and a follower piston positioned within said cylindrical body portion of said container away from said dispensing end of said container, said follower piston having a first side in contact with said second portion of said mass and a second side, said second side being open to atmospheric pressure, said follower piston sealingly and slidingly engaging said inside of said body portion of said container.

12. A combination according to claim 11 wherein said recess means in said first portion of said generally cylindrical body portion of said container comprises a circumferential series of spaced apart recesses.

13. A combination according to claim 11 wherein said externally operable dispensing pump means of said container further has a major portion with a hand engageable portion and a lifter portion, said major portion being attached to said container at said dispensing end for pivoting with respect to said container about an axis, said axis being between said hand engageable, portion and said lifter portion, said pumping piston engaging portion being connected to said lifter portion.

14. A combination according to claim 13 wherein said major portion of said externally operable dispensing pump means is pivotable with respect to said container between a first position corresponding to said first position of said pumping piston and a second position corresponding to said second position of said pumping piston, and wherein said externally operable dispensing pump means further has resilient means extending between said hand engageable portion and said dispensive end of said container, said resilient means biasing said major portion toward said second position.

15. A combination according to claim 14 wherein said externally operable dispensing pump means, including said pumping piston engaging portion, said major portion and said resilient means comprises a single piece which is formed integrally from a thermoplastic material.

16. A combination according to claim 13 wherein said pumping piston engaging portion further has a connector portion extending from said enlarged head portion toward said lifter portion, said connector portion being smaller than said enlarged head portion and defining an annular opening with said aperture in said central portion of said pumping piston, said annular opening being open to flow of the viscous product from said second portion to said first portion when said pumping piston is in said second position.

17. A combination according to claim 16 wherein said pumping piston engaging portion further has a rod portion extending from said connector portion toward said lifter portion, said rod portion being large in relationship to said connector portion in a direction extending transversely of said axis of reciprocation of said pumping piston, wherein said wall means of said container has an aperture extending therethrough, said rod portion being slidingly reciprocable in said aperture of said wall means of said container along an axis extending parallel to said axis of reciprocation of said pumping piston.

18. A combination according to claim 17 wherein said pumping piston engaging portion further comprises a flexible connector portion extending between said rod portion and said lifter portion.

19. A combination according to claim 18 wherein said connector portion is connected to said rod portion at a downwardly facing surface of said rod portion, and wherein said downwardly facing surface has a part cylindrical configuration.

20. A combination according to claim 11 and further comprising spring means compressed between said dispensing end of said container and said central portion of said pumping piston and resilently biasing said pumping piston toward said second position.

21. A combination according to claim 11 wherein said viscous product is toothpaste.

* * * * *